Figure 1:
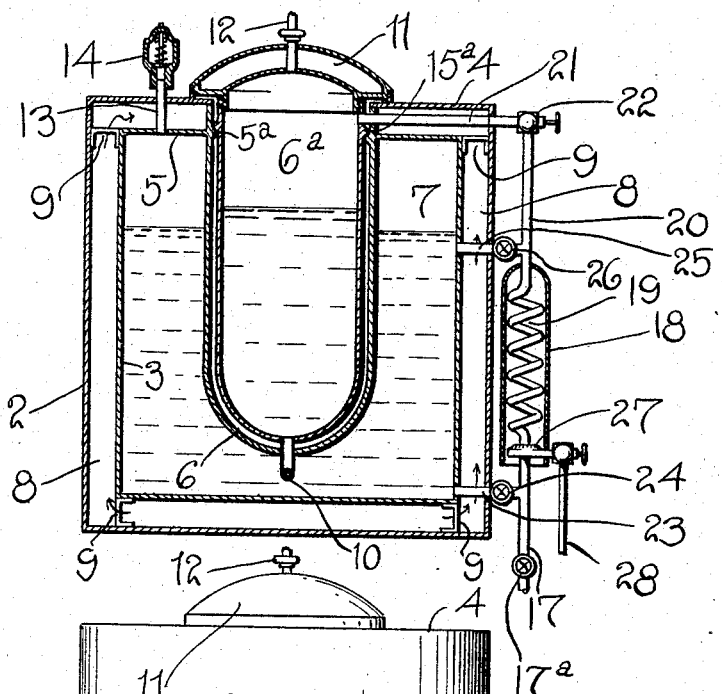

G. EHRHEART.
COFFEE URN.
APPLICATION FILED MAY 17, 1915.

1,185,073.

Patented May 30, 1916.

Inventor
G. Ehrheart
By Watson E. Coleman
Attorney

UNITED STATES PATENT OFFICE.

GEORGE EHRHEART, OF SIOUX FALLS, SOUTH DAKOTA.

COFFEE-URN.

1,185,073.  Specification of Letters Patent.  Patented May 30, 1916.

Application filed May 17, 1915. Serial No. 28,708.

*To all whom it may concern:*

Be it known that I, GEORGE EHRHEART, a citizen of the United States, residing at Sioux Falls, in the county of Minnehaha and State of South Dakota, have invented certain new and useful Improvements in Coffee-Urns, of which the following is a specification, reference being had to the accompanying drawings.

My invention relates to domestic utensils, and particularly to coffee urns or like articles. In the ordinary coffee urn as used in establishments where a relatively large amount of coffee is made and consumed, there is provided a coffee receptacle and a separate hot water receptacle, the water being allowed to flow from the hot water receptacle into the coffee receptacle whenever necessary, and in this form of coffee making apparatus the hot water receptacle has a content approximately the same as the content of the coffee receptacle.

A further disadvantage connected with the ordinary coffee urn is due to the fact that it is not surrounded by an insulating jacket and as a consequence the heat of the coffee is readily dissipated unless the fire is kept constantly going beneath the coffee. This tends to cook the coffee too much, often times causes it to boil more or less continuously, and thus the beverage is not only rendered distasteful but the toxic effect of the coffee is increased.

The primary object of my invention is to provide a coffee urn so constructed that the heat of the coffee is prevented from dissipation and also so constructed that the chamber for the hot water surrounds the urn proper but is separated therefrom by an air chamber, this air chamber preventing the dissipation of the heat of the coffee contained within the urn and also preventing the cold water which may be turned into the water chamber at times from affecting the contents of the urn.

A further object of my invention is to provide a water receptacle having an urn disposed therein with a continuous vacuum chamber surrounding the exterior of the water receptacle.

Still another object of my invention is the provision of means whereby the cold water may be heated to any desired extent before its passage into the hot water receptacle, whereby a circulation of the hot water in connection with the heating device may be provided for, and whereby the hot water from the water receptacle may be turned into the urn or coffee receptacle whenever desired.

A further object of the invention is to so construct the coffee urn that a gas burner may be used for heating the water passing to the water receptacle or heating water for passage directly to the coffee receptacle or urn proper, and providing for the connection of the coffee urn to a city main.

Other objects will appear in the course of the following description.

Figure 2:
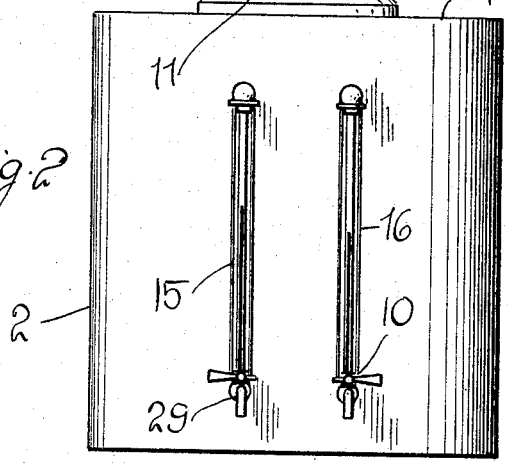
Figure 3:
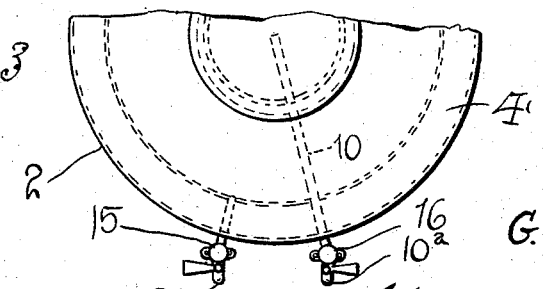

My invention is illustrated in the accompanying drawings, wherein:

Figure 1 is a vertical section through my improved coffee urn; Fig. 2 is an elevation thereof; Fig. 3 is a fragmentary plan view.

Referring to these drawings, it will be seen that my improved coffee urn is preferably cylindrical in form and that the body of the coffee urn comprises the exterior wall 2 and the interior wall 3, the exterior and interior walls 2 and 3 extending across the bottom of the urn and up on either side thereof. The top of the body portion is formed by the spaced walls 4 and 5, which are continuations of the side walls, these top walls 4 and 5 extending inward toward the axial center of the urn and then being extended downward to form the central chamber 6. The walls 4 and 5 of the coffee receptacle and the walls 2 and 3 together inclose a hot water chamber or receptacle 7. The space 8 between the walls of the body portion of the receptacle is exhausted of air so as to provide a vacuum jacket surrounding the water receptacle and extending across the top of the water receptacle. This vacuum space or jacket, which is designated 8, is continuous, but the walls are held in spaced relation to each other by means of braces 9 disposed at any desired points, these braces 9 being perforated or otherwise formed so as to provide for a continuous vacuum chamber. The coffee receptacle 6ª is supported within the chamber 6 in spaced relation to the wall thereof by lugs 5ª.

The bottom of the coffee receptacle 6ª is rounded and from it extends the pipe 10 through which coffee may be discharged, this pipe 10 at its exterior end being provided with any suitable or usual turncock or cap, designated 10ª. The cover of the coffee receptacle 6 is designated 11, and is also double-walled so as to provide an interior vacuum chamber. This cover has screw-threaded engagement with the wall of the receptacle 6ᵃ and with a flange on the top wall 4, and the cover is preferably provided with a steam valve 12. The hot water receptacle 7 is provided with a pipe 13 which extends out through the top of the receptacle and carries at its ends a safety or pressure regulating valve 14 of any suitable construction. A water gage 15 is provided upon the exterior of the urn, the two ends thereof being operatively connected to the hot water space or chamber 7, and also provided upon the exterior receptacle is the coffee gage 16, the two ends of which are connected operatively with the coffee chamber or receptacle 6 by means of pipes passing through the double walls of the water receptacle and then through the double walls of the coffee receptacle.

Extending upward on the exterior of the body 2 is a water pipe 17 which is connected to any source of water, such as a city water main and is provided with a valve 17ᵃ. This pipe extends into a heater casing 18, and the pipe is coiled as at 19 within this casing, then extends outward and upward as at 20 and is laterally bent to pass through the top of the chamber 7 and into the receptacle 6ᵃ as at 21. A valve 22 is provided for regulating the passage of liquid through this pipe into the coffee receptacle 6ᵃ. The pipe 17 is connected to the water chamber 7 by means of a pipe 23 controlled by a valve 24, and the pipe 20 above the coil 19 is connected to the water chamber by means of the pipe 25 controlled by a valve 26. Disposed within the heating chamber 18 is a gas burner 27 of any suitable character, shown as connected to a gas pipe 28. By means of this gas burner the water within the coil 19 may be heated.

The practical use of my invention will be obvious from the above description. When the valves above and below the coil 19 are opened, and the valve 17ᵃ controlling the flow of cold water is closed, a continuous circulation of the water from the hot water chamber into and through the coil is provided for. When, however, the valve 24 below the coil, and the valve 22 are opened, and the valve 26 closed, the hot water in the hot water chamber 7 will be forced into the coffee receptacle by steam pressure, it being understood that the valve 12 in the cover 11 should be opened in order to permit the pressure in the upper end of the coffee receptacle 6ᵃ to be reduced.

The hot water compartment should be substantially twice the capacity of the coffee compartment or chamber. Thus coffee can be made from the water which is already hot and taken from the chamber 7, and there would still be sufficient water left in the hot water chamber to operate the latter. If the capacity of the chamber 7 and the chamber 6ᵃ were approximately equal, as is the case with urns in use at the present time, it would then be necessary to take all of the hot water for the purpose of making coffee and the hot water compartment would at once have to be filled with cold water, thus cooling the coffee and making the urn inefficient. This construction, therefore, does away with the necessity of using two urns of equal capacities, the hot water being in one urn and the coffee in another. It will be obvious that hot water may also be drawn from the chamber 7 by means of the tap 29, and that then the level of the water in the hot water chamber may be again raised by allowing the inflow of water through the pipe 17, the heating coil 19, and through the pipe 25, or cold water may be allowed to flow directly into the chamber 7, if for any reason this is desirable. By providing the continuous chamber 8 entirely surrounding the hot water chamber 7 and the coffee receptacle or chamber, it makes it possible to keep the coffee or other liquid contained within the chamber 6 at a certain temperature indefinitely.

While I have described my invention as applied to coffee urns, it will of course be understood that I am not limited to this use as the principle can be applied to cooking utensils of various classes, bath tubs, oil filters, or a large variety of different devices.

Having thus described my invention, what I claim is:

1. An urn of the character described including an outer receptacle, an inner receptacle dependent into the outer receptacle and provided with a cover, a water heater disposed exteriorly to the outer receptacle and connected to a source of water supply, connections between the water heater and the outer receptacle, and means for conducting water directly from the water heater into the inner receptacle or conducting water from the outer receptacle into the inner receptacle.

2. In an apparatus of the character described, a body having a side wall, a bottom wall, and an annular top wall, the top wall being formed with a depressed central portion defining a chamber, the bottom wall, side wall and top wall of the first-named chamber being double and the space between the walls being exhausted of air, a double-walled cover closing the top of the second-named chamber and exhausted of air, an inner receptacle disposed within the depressed chamber, a water heater, a feed water pipe entering the heater, a valved pipe connecting the water pipe to the water chamber below the heater, a pipe connecting the upper end of the heater to the upper end of the first-named receptacle and controlled by a valve, and a pipe connecting the upper portion of the water heater to the inner receptacle.

3. In an apparatus of the character described, an exterior receptacle having double walls, the space between said walls being exhausted of air, the top of the receptacle being formed to provide a chamber dependent into the receptacle, an interior receptacle disposed within said chamber, a cover therefor, a hot water heater disposed exteriorly to the exterior receptacle, said heater being connected at one end to a source of cold water supply and at the other end being connected both to the interior and the exterior receptacles, means for admitting cold water into the exterior receptacle, and means for establishing communication between the exterior receptacle and the interior receptacle.

4. In an urn of the character described, an outer receptacle having double walls, the space between said walls being devoid of air, the top of the said receptacle being formed with a depressed portion containing a chamber depending into the outer receptacle, an inner receptacle disposed within said chamber and spaced slightly from the wall thereof, a cover closing the upper end of the chamber and said inner receptacle, a water heater, a water pipe extending through said heater connected below the heater to the outer receptacle and above the heater to the upper portion of said outer receptacle and also connected to said inner receptacle, valves for controlling the passage of water from said water pipe into or out of said outer receptacle, and a valve controlling the passage of water from the outer receptacle to the inner receptacle.

5. In an urn of the character described, an outer receptacle, the top thereof extending inward and then downward into the interior of the receptacle to form thereby an air containing chamber, the bottom side and top of the outer receptacle being double walled to provide a non-conductive space between said walls, an interior receptacle disposed within said depending chamber and having shoulders engaging the wall of said chamber and supporting the inner receptacle in spaced relation thereto, a double-walled cover detachably engaging the upper end of said chamber and closing the inner receptacle, a water heater including a heater pipe connected to a source of supply, and means for conducting the water in said pipe either directly into the outer receptacle or directly into the inner receptacle or causing the water of said outer receptacle to circulate through said heater, and means for conducting water from the outer receptacle into the inner receptacle.

In testimony whereof I hereunto affix my signature in the presence of two witnesses.

GEORGE EHRHEART.

Witnesses:
L. E. KATTELMANN,
L. E. WAGGONER.

Copies of this patent may be obtained for five cents each, by addressing the "Commissioner of Patents, Washington, D. C."